United States Patent [19]

Mueller

[11] 4,351,786

[45] Sep. 28, 1982

[54] METHOD FOR MAKING A STRESS-RELIEVED COMPOSITE FOAMED RESIN BASEBALL BAT OR BOWLING PIN

[75] Inventor: Alvin W. Mueller, Ferguson, Mo.

[73] Assignee: Mueller-Perry Co., Inc., St. Louis, Mo.

[21] Appl. No.: 181,175

[22] Filed: Aug. 25, 1980

[51] Int. Cl.$^3$ .................. B29D 27/04; A63B 59/06; A63D 9/00
[52] U.S. Cl. .................. 264/46.7; 264/46.6; 264/46.9; 264/263; 264/268; 264/271.1; 264/DIG. 71; 273/72 R; 273/82 A
[58] Field of Search .............. 264/46.9, 46.7, 46.4, 264/46.5, 46.6, 263, 268, 271.1, DIG. 71; 273/72 R, 82 R, 82 A

[56] References Cited

U.S. PATENT DOCUMENTS

| | | | |
|---|---|---|---|
| 1,555,389 | 9/1925 | Stevens | 264/46.9 X |
| 2,537,982 | 1/1951 | Finn . | |
| 2,857,931 | 10/1958 | Lawton | 264/46.5 X |
| 3,971,837 | 7/1976 | Hasegawa et al. | 264/46.7 X |
| 4,032,143 | 6/1977 | Mueller et al. | 273/72 R |
| 4,048,274 | 9/1977 | Hoge et al. | 264/46.5 |

FOREIGN PATENT DOCUMENTS 47-46456 11/1972 Japan .................. 264/46.9

OTHER PUBLICATIONS

3 M Company Bulletin: "Scotch-Clad Fuel Resistant Coating No. 776", St. Paul, Minn., 3 M Company, Adhesives, Coatings and Sealers Division, Oct. 1, 1966, 2 pp.
3 M Company Bulletin: "Scotch-Grip Industrial Adhesive 847", St. Paul, Minn., 3 M Company, Adhesive, Coatings and Sealers Division, Revised Oct. 1, 1976, 3 pp.

*Primary Examiner*—Philip Anderson
*Attorney, Agent, or Firm*—Jerome A. Gross

[57] ABSTRACT

Composite bowling pins and baseball bats are formed with foamed, cured-in place plastic bodies securely adhered to a central aluminum core by a somewhat thermoplastic adhesive coating. The exothermic reaction attendant to curing the plastic so softens the adhesive coating that it does not interfere with shrinkage of the plastic body relative to the core. This minimizes stress concentrations in the composite construction which otherwise tend to lead to cracking in use.

4 Claims, 4 Drawing Figures

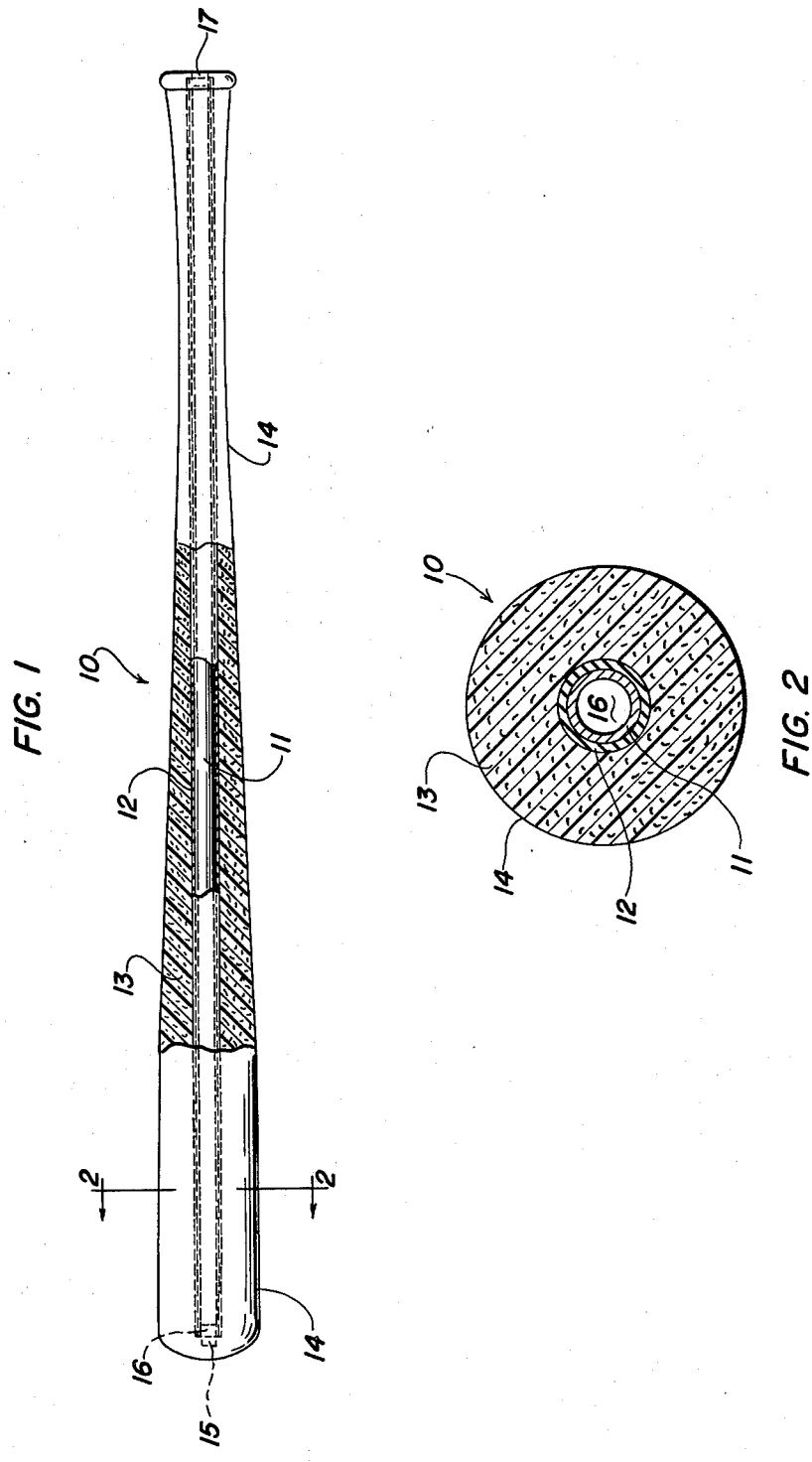

METHOD FOR MAKING A STRESS-RELIEVED COMPOSITE FOAMED RESIN BASEBALL BAT OR BOWLING PIN

BACKGROUND OF THE INVENTION

U.S. Pat. No. 4,032,143 issued June 28, 1977, describes a composite molded baseball bat having a tubular, high yield aluminum core surrounded by a foam plastic body, preferably a polyurethane body, having a density of from 30–50 pounds per cubic foot. This patent describes a method for producing a baseball bat in which the tubular aluminum core is mounted vertically in a mold and the foam plastic is poured into the mold to surround the tube and is then allowed to solidify. This results in a bat lacking a knob at the handle end and a plastic knob is subsequently glued or molded on to close or cap the tube at the gripping end of the bat.

One of the problems encountered when using the method of the above patent is whether the plastic body, e.g. polyurethane, may fail to adhere adequately to the tube resulting in an actual slippage of the tube relative to the plastic body. It is believed that such lack of adhesion may be caused by the surface oxidation of the aluminum. In any event, such lack of adhesion would result in a bat which is not suitable for its intended purpose. On the other hand, should the plastic body adhere to the tube, shrinkage of the plastic body on curing tends to be resisted by compression in the tube, which thus imposes stresses on the plastic. Therefore, the plastic body may crack or fracture, either on curing or, more usually, after some period of use, the cracks extending radially outward from the tube to the outer skin of the plastic body, thus rendering the patent unfit for use. It is believed that compression in the tube, induced by the shrinkage of plastic adhering to it, opposes the shrinkage of the plastic body during curing, and the resulting nonuniformity of shrinking produces tension or stress zones, or areas which ultimately are relieved by cracking, as when the bat strikes a baseball during use.

U.S. Pat. No. 3,971,837 issued July 27, 1976, describes a composite foamed bowling pin having a steel or aluminum pipe or tube surrounded by a cellular polyurethane body which is in turn surrounded by a solid sheet of thermoplastic resin, e.g. cellulose acetate, to provide an exterior finish for the bowling pin. To the extent that this method utilizes an aluminum tube or pipe around which the polyurethane body is molded, the same problems are encountered as are referred to above in regard to U.S. Pat. No. 4,032,143.

SUMMARY OF THE INVENTION

One object of the present invention is to provide a method of making a truly integral composite elongated molded article such as a baseball bat or bowling pin in which the foam plastic body adheres to a tubular aluminum core without slippage and yet substantially without opposed stresses in the core and in the plastic body, so that the plastic body does not crack or fracture under conditions of ordinary use for a period corresponding to that usually attainable with an all wood product. Another and principal object of this invention is to provide a method for producing such a baseball bat or bowling pin.

Summarizing briefly, and without limitation, the present invention provides a method of making a composite molded baseball bat, bowling pin or similar elongated article of a type subject to impacts, in which a substantially stress-relieved foam plastic body such as polyurethane, having a density of from about 30 to about 50 pounds per cubic foot, is bonded to a tubular aluminum core by means of a Buna N polymer adhesive composition coated thereon, and whose limited thermoplasticity is sufficient to relieve (or avoid) shrinkage stresses as between the plastic body and the core. Generally, this core has an outside diameter of about 0.75 to about 1 inch, a wall thickness of from about 0.06 to 0.125, preferably 0.07 to 0.10 inch, and a yield strength of at least 30,000 p.s.i., the composite products have an outer skin of the same material as the body and integral therewith.

As importantly, the present invention also provides a method for producing the elongated, axially reinforced articles with substantial freedom from stresses accompanying shrinkage of their plastic bodies, which the metal core would otherwise offer. A significant step in the method of this invention is the coating of the tubular aluminum core with a Buna N type composition prior to forming the foam plastic body around the tubular core. The coating functions to soften under the heat of reaction of the foamed plastic, thus to substantially lessen or eliminate the core's resistance to shrinking of the body. One way of applying such coating is to brush or spray a solution of the composition on the core and allow it to air dry or it may be force dried by heat to remove substantially all of the liquid components of the composition. Usually suitable results are obtained by applying one coat of the composition, although two or three coats may be used. Compositions which have been found to be particularly useful for coating the tubular core are Scotch-Clad Brand Fuel Resistant Coating, Product Specification No. 776, and Scotch-Grip Industrial Adhesive, Product Specification No. 847, both of which are manufactured by the 3M Company, St. Paul, Minnesota. Both of these compositions comprise a butadiene-acrylonitrile elastomer base dissolved in a ketone, namely methyl isobutyl hetone for No. 776 and acetone for No. 847. Other Buna N type compositions which may be used will be referred to hereinafter.

Of the various plastics which can be formed and molded under pressure to provide a fine celled foam having, when cooled, the required density, polyurethane foams are preferred. As is known to those skilled in the polyurethane art, polyurethane foams are formed by admixture of an organic polyisocyanate, for example 4,4' diphenyl methane diisocyanate, and a material providing a plurality of active hydrogen atoms, such as a liquid polyhydric alcohol, for example, an adduct of sucrose and propylene oxide. Usually, a pigment such as titanium dioxide in an amount of 2–40% of the weight of the polyhydric alcohol is dispersed in the polyhydric alcohol and a blowing agent and a catalyst are added, after which the organic polyisocyanate is mixed in to provide a curable mixture capable of being molded to form the plastic body.

While polyurethane foams are preferred, any tough and strong plastic, of generally similar density and without adverse shrinkage characteristics, can be used. It is preferred to employ plastic forming systems (sometimes hereinafter as a foam plastic processor) which can be injected into the mold as a flowable liquid at moderate temperatures and which cures with the generation of exothermic heat to form a solid body with time. Illustrative of such systems are epoxy resin systems containing amine curing agents, for example, methylene dismiline.

BRIEF DESCRIPTION OF THE DRAWINGS

A further understanding of the present invention will be gained from the accompanying drawing in which:

FIG. 1 is a side view, partially in section, showing a stress-relieved baseball bat constructed in accordance with this invention;

FIG. 2 is a cross-section on an enlarged scale taken on the line 2—2 of FIG. 1;

DESCRIPTION OF THE PREFERRED EMBODIMENT

Figure 3:
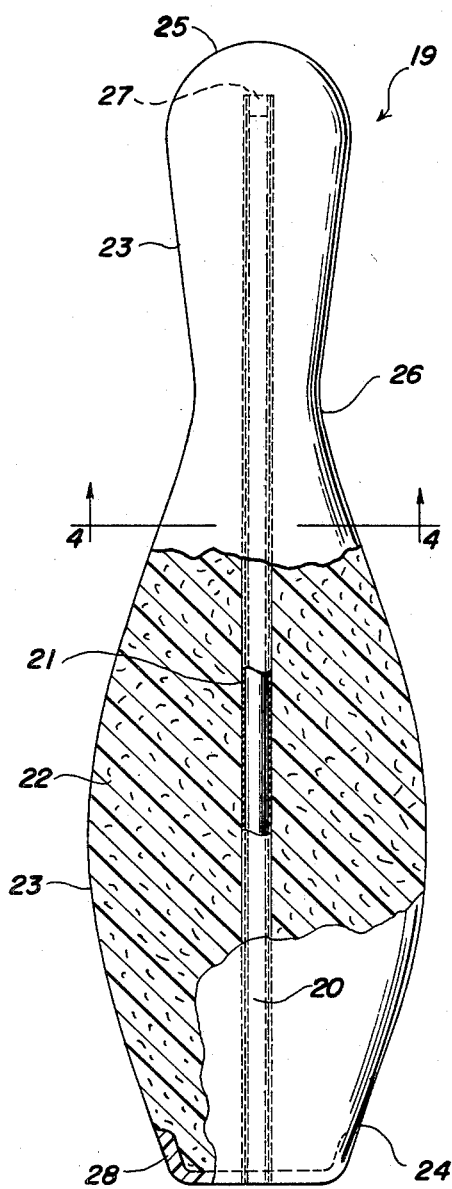
FIG. 3 is a side view, partially in section, showing a stress-relieved bowling pin constructed in accordance with this invention.

Referring to the drawings, FIGS. 1 and 2, the baseball bat 10 is of conventional shape and comprises an aluminum tube or core 11, which extends almost the entire length of the bat, a coating 12 of Buna N type composition covering the core 11, and a molded plastic bat body 13 about the coating and tube. Tube 11 is hollow and thin walled, as shown in the broken-away portion of FIG. 1, and in the enlarged cross-section of FIG. 2, and thus serves to provide a lighter and less expensive bat particularly suited for younger players. The coating 12 provides a very strong adhesive bond between the tube 11 and plastic body 13. The molded body 13 is of high density foam plastic, and the outer surface of body 13 has an integral outer skin 14. The term integral as used here means that the skin 14 is composed of the same plastic as body 13, but the skin surface is substantially continuous and non-cellular.

As can be seen in FIG. 1, its tube 11 extends almost the full length of the bat, with the end of the tube at the larger diameter end 15 (striking end) of the bat being covered by the end portion of the molded plastic body. A compressible plastic or rubber plug 16 closes the end of tube 11 to keep it from filling with plastic. The end of tube 11 at the handle end of the bat is also provided with a plastic or rubber plug 17 and the entire handle end of the bat is integral with and of the same plastic material as the striking portion of the bat.

Figure 4:
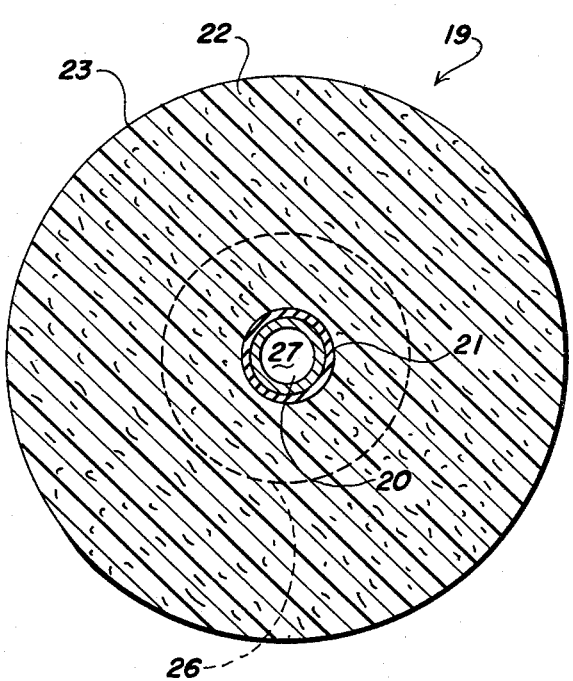
FIG. 4 is a cross-section on an enlarged scale taken on the line 4—4 of FIG. 3.

The bowling pin 19, shown in FIGS. 3 and 4, is of conventional shape and comprises an aluminum tube or core 20, which extends almost the entire height of the pin, a coating 21 of Buna N type composition covering the tube 20, and a molded plastic bowling pin body 22 about the coating and tube. Tube 20 is hollow and thin walled, as shown in the broken-away portion of FIG. 3, and in the enlarged cross-section of FIG. 4, and has substantially the same wall thickness as tube 11 in FIG. 1. The coating 21 provides a very strong adhesive bond between the tube 20 and plastic pin body 22, thus preventing the tube from disengaging from the pin body and sliding out of the base 24 of the pin. The molded pin body 22 is composed of high density foam plastic, and the outer surface of body 22 has an integral outer skin 23 of the same nature or properties as outer skin 14 of the baseball bat.

Referring again to FIG. 3, the tube 20 extends almost the full height of the bowling pin, with the upper end of the tube at the upper end 25 of the pin being covered by the upper portion of the molded plastic body. The pin has a characteristic narrower neck portion 26 as shown in FIG. 3 and by the circular dotted line in FIG. 4. A plastic or rubber plug 27 closes the end of tube 20 to keep it from filling with plastic. The pin shown in FIG. 3 has a nylon 66 or nylon 6–12 base disc 28 at the base 24 of the pin, and this disc is bonded to the pin body 22 during the molding operation. Such preferred construction meets the specifications of the American Bowling Congress. However, this disc is optional and may be omitted so that the entire bowling pin body is composed of the foam plastic.

Generally, the aluminum core will be about 90–98% of the length or height of the bat or pin, but preferably in the range of 95–98%. The baseball bat and bowling pin embodiments of this invention possess utility characteristics which closely match the conventional wood products they are intended to replace, and generally have a useful life equal to or exceeding that of their wooden counterparts.

The method described hereinafter with respect to the making of the baseball bat of this invention is also generally applicable to the making of a bowling pin. Accordingly, although the following description refers specifically to the making of a baseball bat, it will be understood that such method is also applicable to the making of the bowling pin, with such modifications and exceptions noted as the description of the invention proceeds.

In the method of this invention, a tubular aluminum core (tube 11) is used which has the characteristic hereinbefore described.

The core is coated with a suitable Buna N type coating composition such as, for example, Scotch-Clad Brand Fuel Resistant Coating, Product Specification No. 776 or Scotch-Grip Brand Industrial Adhesive, Product Specification No. 847, both of which are products sold by the 3M Company, St. Paul, Minnesota, U.S.A. These compositions are in liquid form and can be brushed or flowed on the core surface and then air or forced dried to form a dry-to-the-feel coating. They comprise a Buna N polymer, that is, rubbery butadiene-acrylonitrile polymer, a toughening agent, for example, salicylic acid or a zinc salt thereof and an oil-soluble heat-reactive phenol-formaldehyde resin; all dissolved in a ketone, acetone in the case of No. 847 and methyl isobutyl ketone in the case of No. 776. A further description of these coating compositions and alternatives is given in the specific example and subsequent description. One or two coats or layers of the coating composition are applied to the core resulting in a dry or substantially dry film or layer 12 of about one to three mil. thickness. If more than one coat is applied, the first coat is preferably dried before the subsequent coat is applied.

The coated core, as obtained above, is next positioned in a suitable mold, for example, a split mold, having an interior cavity such that when it is filled with foam plastic, it will have the desired shape and length of a baseball bat, or a bowling pin, if such is desired. Since either product of this invention has a surface which is symmetrical radially outward from the longitudinal axis of the bat or the vertical axis of the bowling pin, the coated core is positioned in the mold so that its axis is coincident with or substantially coincident with such axis of the desired product. This can be accomplished in the case of a baseball bat by positioning the plastic plugs 16 and 17 at the ends of the core into a recessed portion of the mold so that the core axis will have the desired alignment. With the bowling pin this can be accomplished by positioning the core so that the plastic plug 27 is positioned in a recess of the mold and the other end of the core is positioned over a protuberance in the mold since this end of the core rests against the other end of the mold. By proper positioning of such recess and protuberance in the mold, the core axis can be properly aligned with the desired vertical axis of the bowling pin.

After the core has been positioned in the mold, the mold is closed and the mold cavity is filled with a liquid plastic material which will foam and then congeal in the mold around the core to form a foam plastic body having a density controlled in the range of about 30 to about 50 pounds per cubic foot. Such density is needed to provide a bat or pin having the same use properties as a correspondingly shaped wooden bat or pin. Of the various plastics which can be foamed and molded under pressure to provide a fine celled foam having the requisite density, polyurethane foams are preferred. Polyurethane foams, as is known, are formed by the reaction of an organic polyisocynate and a material providing a plurality of active hydrogen atoms, for example, a liquid polyhydric alcohol, in the presence of a blowing agent and a catalyst to catalyze the reaction. In a preferred embodiment of this invention, the polyurethane foam is produced by the reaction of (1) a commercial mixture of 4,4' diphenyllmethane diisocyanate together with higher molecular weight isocyanate-functional derivatives thereof having an average NCO content of 31.5 and an average equivalent weight of 131 and (2) a liquid sucrose-based polyol provided by adducting sucrose with propylene oxide to form a liquid having a viscosity of 750 centipoists (measured at 25° C.) and an hydroxy functionability of 340 milligrams of KOH per gram of polyol.

In forming the foam plastic bodies 13 or 22 (FIGS. 1 and 3, respectively), one step involves adding a pigment such as titanium dioxide to the polyol in an amount of about two to about 40%, more preferably about 32 to about 38%, of the weight of the polyol together with about 12 to about 16% of a blowing agent such as monofluro-trichloromethane based on the weight of polyol and a catalyst, for the polyol-polyisocyanate reaction, such as triethylene diamine. These ingredients are mixed together using a high speed stirrer to provide a good dispersion, and additional blowing agent is added to replace any blowing agent lost in the mixing process. To this mixture is added the polyisocyanate mixture, described above, thus providing a liquid mass which reacts in the mold to form the foam plastic body. This mass, prior to pouring into the mold, is usually at a temperature in the range of about 55° F. to about 90° F., a preferred range being about 70° F. to about 85° F., and to attain the higher temperatures some degree of heating of the mass may be required. Also, prior to pouring the liquid mass into the mold, it is preferable to heat the mold to a temperature of about 100° F. to about 140° F.

After the liquid mass is poured into the mold an exothermic reaction takes place and the mass temperature increases to about 230°-240° F. At these temperatures the core coatings 12 or 21 (FIGS. 1 and 3), respectively, will soften sufficiently that its exterior surface becomes slippery or slidable. As the mass hardens or sets up in the course of reaction, the mass is free to shrink and draw together axially, slipping along the coating on the aluminum core, because of the soft condition of the coating. Since shrinking is not substantially resisted by the slidable surface of the coating, the foam plastic body thus formed is largely free of stresses which would otherwise cause fracturing or cracking, either at the time of shrinking or later under conditions of use. In this respect the bowling pins described are the clearer exemplification of the present concept, because their aluminum cores extend to both ends of the plastic bodies.

As the mass hardens or congeals and cools the core coating reverts back to a hardened coating or film which thereafter provides good adhesion between the foam plastic and the core.

Without such adhesion, the metal core would not of course serve its purpose. However, the adhesion itself (in the absence of the present coating) causes difficulty; if the foam plastic adhered securely to the aluminum core, such adherence would occur before full shrinkage of the plastic body; and such shrinkage would be resisted by axial compression in the metal core. Areas of resisted shrinkage would tend to crack either on curing or subsequently in use.

In the process, the density of the foam plastic is controlled by the proportion of plastic, for example, liquid mass (with blowing agent) introduced into the mold cavity. Generally, in the case of a bat, suitable density results are obtained charging 1 oz. of liquid mass per inch of bat length into the mold cavity. Of course, it will be understood that once the liquid mass is poured or otherwise introduced into the mold cavity the mold is closed until the mass has set up or hardened to form the dense plastic foam. As was previously noted herein, the bat or pin should have an outside skin which is substantially continuous or non-cellular; such a skin can readily be obtained by controlling the amount of blowing agent in the liquid mass.

After the exothermic reaction in the mass has stopped and the reaction product (foam plastic) has set up or congealed, which requires about 15 to 25 minutes, the mold is opened and the article, i.e., bat or pin, is removed and allowed to cool. The article can be used as is or painted. Preferably, the desired final color of the article is obtained by using pigments in the liquid mass which will provide the final color desired.

The following specific embodiment is illustrative, but not intended to be limitative, of a method for making a bat in accordance with this invention.

An aluminum alloy tube having a length of 35 inches, an outside diameter of 0.875 inch, a wall thickness of 0.083 inch and a yield strength of 30,000 p.s.i. is brush coated with the Buna N type Scotch-Clad Brand Fuel Resistant Coating sold by 3M Company. This coating material contains as its essential ingredients a butadiene-acrylonitrile rubbery polymer elastomer, an oil-soluble phenol-aldehyde resin and a toughening agent, all dissolved in methyl insobutyl ketone. This solution is transparent amber in color, has a net weight of 7.3 lbs./gal., a solids content of about 24% by weight, a flash point (T.O.C.) of 60° F. and a viscosity of about 2,000 centipoises as measured in a Brookfield viscosimeter RVF #3sp at 20 rpm. After the coating is applied it is allowed to air dry until a solid, non-tacky film about 1 mil. thick is formed over the entire surface of the tube or core. This film will soften at a temperature of 150° F.

The coated tube is then plugged at both ends with rubber plugs and positioned in a split mold having the conventional figuration of a baseball bat, as to its interior cavity, so that the longitudinal axis of the core is coincident with the longitudinal axis of the finished bat. Stated differently, the core is so positioned in the mold that when the foam plastic is formed around the core, the outer surface of the plastic body is symmetrical radially outward from the core. The core extends about 98% of the length of the mold cavity.

Next, a liquid mass capable of forming a dense foam polyurethane body is prepared as follows: 8417 grams of a liquid sucrose-based polyol provided by adducting sucrose with propylene oxide to form a liquid having a viscosity of 750 centipoises (measured at 25° C.), and an hydroxy functionability of 340 milligrams of KOH per gram of polyol, are placed in a five gallon container and 2987 grams of titanium dioxide pigment are stirred in together with a yellow iron oxide colorant. This mixture is stirred vigorously to provide a good color. The polyol is a commercial product supplied by Mobay Chemical Co. under trade identification E 9339, and contains about 15% monofluro trichloromethane (as the blowing agent). Some of this blowing agent is lost during mixing and is replaced when mixing is concluded. The amount of such agent used will vary with the skin thickness desired. In this example, a foam density of 40 pounds per cubic foot is intended, and the blowing agent is added in an amount of 5% of the polyol used, and the amount of foamable mixture introduced into the mold is regulated to provide the desired density. The additional blowing agent is added after cooling and then triethylene diamine catalyst is added to speed the reaction when the organic polyisocyanate is added. Upon addition of catalyst, a polyol mixture is provided to which the organic polyisocyanate is added.

The organic polyisocyanate used in this example is 4,4' diphenylmethane diisocyanate in a commercial mixture containing the same together with higher molecular weight isocyanate-functional derivatives thereof having an average NCO content of 31.5 and an average equivalent weight of 131. It is added to the mixture in an amount to provide a weight ratio of polyol mixture to polyisocyanate of 1.45:1. A commercially available polyisocyanate of this type is E388 obtainable from Mobay Chemical Co.

The liquid mass as produced above is next poured or otherwise introduced into the mold, which has been preheated to a temperature of 120° F., in an amount of about 1 oz. per 1 inch length of the aluminum core. The split mold is then closed and the liquid mass undergoes an exothermic reaction to form a foam polyurethane during which the temperature of the mass will rise to about 235° F. At a temperature above 150° F. the coating on the aluminum core will soften, but will not deteriorate at the 235° F. temperature attained. As the polyurethane foam, that is, the foam plastic, cools it is free (except at and adjacent to its ends) to slidably shrink along the axis of the core, since the coating is still soft, and thus the formation of stress zones or areas in the polyurethene body is minimized or avoided. The compressibility of the rubber plugs 16, 17 lessens the resistance to axial shrinkage of the foam plastic in the end regions. As the mass cools below 150° F. the coating again congeals or solidifies and forms a strong adhesive bond between the core and the polyurethane body. After about 20 minutes from the time the liquid mass is poured into the mold the polyurethane body is formed and the mold can be opened and the bat removed.

The resultant bat has substantially all of the desirable ball-striking characteristics and properties of an all wood bat, and has a useful life comparable to that of an all wood bat. The core does not separate from the polyurethane body, and the body is generally free of cracks from the handle to the center of percussion.

A bowling pin is readily formed using the techniques and materials described above for making the baseball bat. A bowling pin thus formed has substantially all of desirable characteristics of an all wood pin and has a useful life which often exceeds that of an all wood pin. In addition, the core does not separate from the polyurethane body and the polyurethane body does not fracture when struck during use by a bowling ball.

Although the method of this invention has been described with reference to the use of a specific Buna N type composition, it is possible to employ a variety of Buna N type compositions such as those described in U.S. Pat. No. 2,537,982, issued Jan. 16, 1951, the description of which is hereby incorporated by reference. In general, the coating compositions described in this patent comprise a rubbery polymer or a Buna N elastomer of butadiene and acrylonitrile in the proportions of about 50:50 to about 85:15, respectively, a ketone such as acetone or isobutyl ketone as the solution medium and a toughening agent such as salicyclic acid or the zinc or magnesium salts thereof, or the like salts of benzoic acid or substituted benzoic acids. The properties of the coatings formed from such compositions may be altered by incorporating in the composition a tackifier such as an oil soluble, phenol-aldehyde resin, for example, made by reacting 1 mol. of p-t-amylphenol as p-phenyl phenol with more than one, preferably about two mols. of formaldehyde, in the presence of an alkaline catalyst, to a point at which the cold resin is solid, but still heat-hardening. Further, such coating compositions may be modified by incorporating a softener for the rubbery polymer and mold tackifier such as a soft coumarone-indene resin. Another tackifier which may be incorporated in the coating compositions is a polyhydric alcohol (e.g. diethylene glycol) ester of a gasoline-insoluble acidic pine wood resin produced by extracting resinous wood with a coal tar hydrocarbon, removing the hydrocarbon by evaporation, extracting the residue with a petroleum hydrocarbon and recovering the gasoline-insoluble resin. Other ingredients, as well as these referred to above, which can be used in the coating compositions and the proportions of all materials which can be used are described in greater detail in the aforesaid patent.

The principal properties desired in the coating formed from the above described compositions are that the coating, preferably somewhat thermoplastic, will be soft under the exothermic reaction conditions that exist during the formation of the foam plastic body, and that the coating thereafter forms at room temperature a strong adhesive bond between the foam plastic body (e.g. polyurethane) and the aluminum core.

In the light of these requirements, it will be apparent that other coatings may be employed which are either thermoplastic at such exothermic temperature or at least cure thereafter at room temperature or under conditions of use. It is also possible to practice the invention using other polyol and diisocyanate reactants to form the polyurethane foam body provided that a foam density in the range of 30 to 50 pounds per cubic foot is obtained and the plastic body has the proper toughness to be used for its intended purpose without fracturing under conditions of use. Polyols prepared from propylene oxide, ethylene oxide or mixtures thereof or by adduction with other polyhydric materials such as sucrose, glycerol, pentaerythritol are polyols which may be used individually or in combination together with polyisocyanates to make polyurethanes.

It will be apparent that the invention is not limited to bats and pins for baseball and bowling, but applies to any generally elongated article, usually of a type subjected to high impacts, whose exterior surface is a surface of revolution and having a relatively high strength axially extending core, a cured-in-place plastic body of the type which has an exothermic reaction and shrinks somewhat on curing; and an adhesive coating bonding them, of the type which softens under heat corresponding to that of the exothermic reaction and thereafter hardens at room temperature under conditions of use.

I claim:

1. The method of making a molded composite baseball bat, bowling pin or like article having a body of cured-in-place foam plastic of a type which has an exothermic reaction and shrinks on curing comprising the steps of coating an elongated aluminum core with an adhesive of the type which at least partly softens at the temperature of such exothermic reaction and which at room temperature will securely bond foamed plastic to said core causing said coating to dry, mounting said coated core within a mold, foaming plastic material thereabout within the mold and causing such exothermic reaction, softening the dry adhesive coating on the core with the heat of such exothermic reaction, permitting the foamed plastic to shrink and draw together slippingly along the softened adhesive coating on the core, and thereafter permitting the adhesive coating to harden during cooling of said foamed plastic, whereby to minimize stresses which would otherwise accompany resistance of the core to the shrinking of the plastic.

2. A method of making a baseball bat or bowling pin having a foam plastic body and the use characteristics of a wooden counterpart comprising the steps:

(a) of coating a tubular, high yield strength aluminum core with a liquid coating composition containing a rubbery polymer of butadiene and acrylonitrile as an essential ingredient, said core having a diameter of from about 0.75 to about 1 inch, a wall thickness of from about 0.06 to about 0.125 inch and a yield strength of at least 30,000 p.s.i.;

(b) removing substantially all of the liquid components of said composition from the coating;

(c) positioning the dry coated core in a mold having an internal cavity shaped in the configuration of the desired bat or pin so that the long axis of the core is substantially coincident with the long axis of the bat or pin;

(d) introducing into the mold cavity a foam plastic precursor which reacts under exothermic conditions to create a temperature above the softening temperature of said coating and to form a foam plastic body which is free to shrink along the axis of said core during cooling without substantially adhering to said coating, the amount of said plastic precursor employed being controlled to provide a foam plastic body having a density of from about 30 to about 50 pounds per cubic foot; and (e) removing the thus formed bat or pin from said mold.

3. A method of making a baseball bat in accordance with the method of claim 2, in which:

(a) said core has a wall thickness of from 0.07 to 0.1 inch;

(b) said coating composition contains a rubbery polymer of butadiene and acrylonitrile in the proportions of about 50:50 to about 85:15, respectively, and an oil soluble phenol-aldehyde resin as essential ingredients, and a ketone solvent for said essential ingredients; and (c) said foam plastic precursor comprises (1) polyisocyanate and polyol components that react to produce exothermic heat, (2) a pigment, (3) a blowing agent and (4) a catalyst to catalyze the reaction of said components.

4. A method of making a bowling pin in accordance with the method of claim 2, in which:

(a) said core has a wall thickness of from 0.07 to 0.1 inch;

(b) said coating composition containing a rubbery polymer of butadiene and acrylonitrile in the proportions of about 50:50 to about 85:15, respectively, and an oil soluble phenol-aldehyde resin as essential ingredients, and a ketone solvent for said essential ingredients; and (c) said foam plastic precursor comprises (1) polyisocyanate and polyol components that react to produce exothermic heat, (2) a pigment, (3) a blowing agent and (4) a catalyst to catalyze the reaction of said components.

* * * * *